United States Patent [19]
Herbertz

[11] 3,918,295
[45] Nov. 11, 1975

[54] METHOD OF NONDESTRUCTIVELY TESTING MATERIALS BY ULTRASOUND

[75] Inventor: Joachim Herbertz, Laurensberg, Germany

[73] Assignee: Raimar Pohlman, Aachen, Germany

[22] Filed: May 30, 1973

[21] Appl. No.: 365,324

[30] Foreign Application Priority Data
June 5, 1972 Germany.............................. 2227259

[52] U.S. Cl. .............. 73/67.7; 73/67.6; 73/71.5 US
[51] Int. Cl.² .......................................... G01N 29/04
[58] Field of Search ............... 73/67.5 R, 67.6, 67.7, 73/67.8 R, 67.8 S, 67.9, 71.5 US

[56] References Cited
UNITED STATES PATENTS

| | | | |
|---|---|---|---|
| 3,436,958 | 4/1969 | Proctor................................ | 73/67.6 |
| 3,555,887 | 1/1971 | Wood.................................. | 73/67.5 R |
| 3,583,213 | 6/1971 | Houck et al. ..................... | 73/67.5 R |
| 3,786,672 | 1/1974 | Gaertner........................... | 73/67.5 R |

*Primary Examiner*—Richard C. Queisser
*Assistant Examiner*—John P. Beauchamp
*Attorney, Agent, or Firm*—Neil F. Markva

[57] ABSTRACT

A method of nondestructively testing materials by ultrasound comprises continuously supplying a non-contact-making transmitter with electrical high-frequency power at a suitable frequency for generating ultrasound waves; amplitude-modulating with a low frequency in the transmitter and/or in a receiver the ultrasound waves generated in the transmitter and/or the signal voltage received in the receiver by the creation of a low-frequency magnetic field; and using the amplitude-modulation for separating the received signals from internal noise or external interference.

9 Claims, 6 Drawing Figures

METHOD OF NONDESTRUCTIVELY TESTING MATERIALS BY ULTRASOUND

BACKGROUND OF THE INVENTION

This invention relates to a device for and a method of nondestructively testing materials by ultrasound as well as equipment for the generation, transmission and reception of the ultrasound waves used for the test.

Methods of nondestructively testing materials are known which comprise in a receiver detecting the energy of sound waves which have been refracted or reflected at discontinuities in the test material, and evaluating the received signal. These known methods make use of pulses or short wave trains which are identified by their transit time from transmitter to receiver, and which can be cleanly separated from background noise and other interference entering the receiver during transmission.

For the nondestructive testing of materials it is also known to transmit and receive ultrasound by making use of the magnetostriction of magnetostrictive materials. Also known are methods of nondestructively testing materials by transmitting and receiving ultrasound waves contained in electroconductive materials by making use of electrodynamic interacting inductive effects.

The use of these known methods of transmitting and receiving ultrasound for the nondestructive testing and inspection of materials involves technical difficulties because contrary to piezoelectrical transducers which are placed into direct contact with the test material only a very small fraction of the signal power employed is converted from electrical into acoustic energy and back again from acoustic into electrical energy so that the signal to noise ratio in the receiver is very poor.

SUMMARY OF THE INVENTION

It is the object of the invention to provide a method for the nondestructive testing and inspection of materials by making use of the advantageous properties possessed by transducers which are not in contact with the test material and which entirely rely on the reception of the sound waves that are refracted or reflected at discontinuities or defects inside the material.

To attain this object the present invention provides a method of nondestructively testing materials by ultrasound, comprising the steps of a. continuously supplying a non-contact-making transmitter with electrical high-frequency power at a suitable frequency for generating ultrasound waves;

b. amplitude-modulating with a low frequency in the transmitter and/or in a receiver the ultrasound waves generated in the transmitter and/or the signal voltage received in the receiver by the creation of a low-frequency magnetic field, and c. using the amplitude-modulation for separating the received signals from internal noise or external interference.

The outstanding feature of this method is that instead of using pulses, as is usual in other methods, the transmitter produces sound waves continuously, for instance of 300 kc/s, which are amplitude-modulated by the effect of a low-frequency magnetic field. The receiver is capable of detecting these continuously transmitted sound waves if in the zone where the transmission and receiving characteristics overlap there is a point which causes the continuously transmitted sound waves to be diverted towards the receiver. Owing to the low frequency magnetic field in the receiver the received signal experiences another amplitude modulation. Analogously to radio technology it might be appropriate to say that the transmitter transmits two side bands suppressing the carrier, and the receiver forms further sidebands to these sidebands which are displaced by the receiver low frequency. Apart from the original high frequency the general result in the receiver is the generation of sidebands which arise as addition and difference frequencies in the transmitter and the receiver.

The non-contact-making equipment for the generation and reception of sound waves according to the invention generates a low frequency magnetic field in the test material for modifying the conversion of energy, and by virtue of its adaptation to specific directions of propagation or of specific acoustic modes of the sound waves it permits sound waves that have been dispersed or reflected at discontinuities or of modes that have been reflected or converted at discontinuities in the material to be selectively detected.

BRIEF DESCRIPTION OF THE DRAWINGS

Some embodiments of the invention will now be described by way of example and with reference to the accompanying drawings, in which.

DESCRIPTION OF THE PREFERRED EMBODIMENTS

Figure 1:
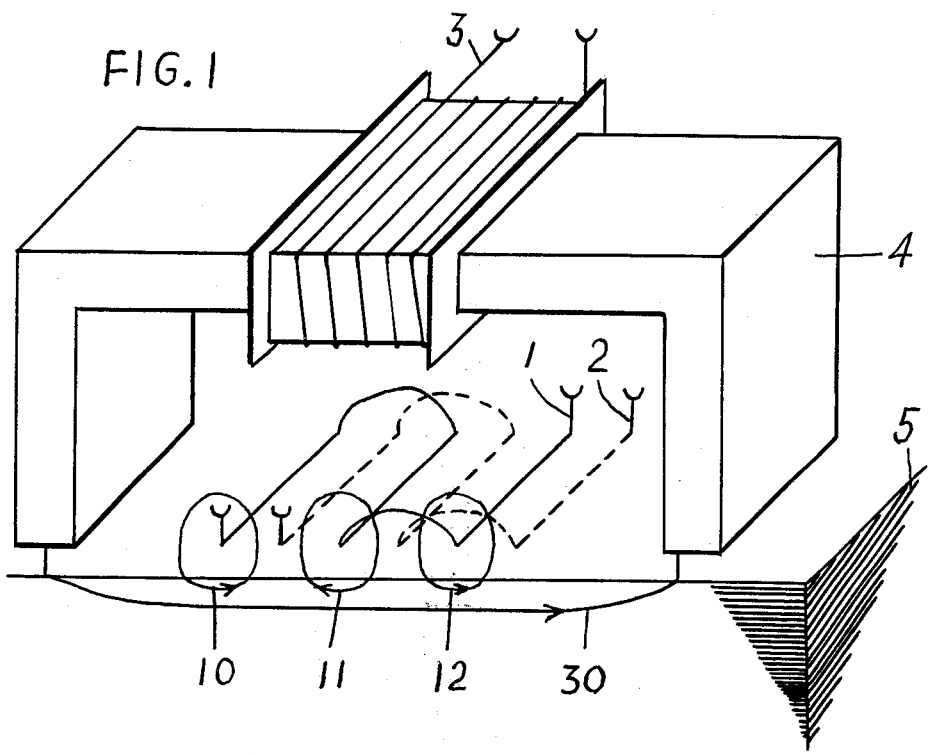
FIG. 1 is a perspective view of a non-contact-making transducer according to the invention based on magnetostrictive interaction for the transmission and reception of directional ultrasonic vibrations in materials that are to be tested.

Referring first to FIG. 1 two high-frequency windings 1 and 2 are provided in the form of flat windings near the surface 5 of a magnetostrictive workpiece. The magnetic field of a coil 3 is applied through a magnet yoke 4 to the workpiece and serves for polarizing the same. One flux line is shown at 30. During transmission, a constant high-frequency current flows through winding 1 and generates a high-frequency magnetic field of which a few field lines are indicated at 10, 11 and 12.

The magnetostrictive forces generated in the workpiece 5 are non-linear functions of the magnetic flux. When the magnetic field generated by the coil 3 is superimposed upon the high-frequency magnetic fields it determines to what extent a given high-frequency magnetic field will generate forces. An embodiment of the proposed materials testing equipment uses a high frequency which can be tuned to between 300 and 600 kc/s and a low frequency polarization of 80 c/s. The low frequency filter for fault detection is tuned to 160 c/s.

This known relationship is utilized in many magnetostrictive ultrasound transducers to achieve the greatest possible energy conversion by means of a suitable constant polarization of the test object.

In contradistinction thereto, the proposed present method of transmitting and receiving makes use of a polarization of the test object which is so chosen that the functional dependence of energy conversion upon the magnitude of polarization is particularly high, and superimposes upon this constant polarization a low-frequency alternating magnetic field. The non-contact-making transducer according to the invention is operated by passing a suitably chosen direct current and a low-frequency alternating current through the coil 3. In this method of operation the magnitude of energy conversion is so controlled by the low-frequency current that at constant HF currents through the high-frequency windings in transmission sound waves which are amplitude-modulated by low frequency will be produced. In the proposed testing method those parts of the spectrum of the transmitted sound waves are used which have a frequency differing from that of the HF currents (sidebands). The testing method may be confined to an evaluation of the continuously generated sound waves which have frequencies equal to the sum and the difference of the high-frequency and low-frequency currents used.

By adjusting the frequency of the currents flowing through the high-frequency winding 1 the directions in the magnetostrictive workpiece can be determined in which due to resonant excitation particularly powerful sound waves are emitted. Moreover, by a phase-shifted operation of the high-frequency winding 2 a one-sided directional effect of the transducer can be obtained. These relationships between geometrical disposition, frequency, phase partition and directionality of emitters which are already known from the technology of antennae and interdigital transducers for delay lines, can be utilized for achieving suitable directional properties in transducers according to the invention for the testing of materials without contact.

For reception, the proposed employment of non-contacting testing transducers based on magnetostrictive interaction implies that by operation of the polarizing coil 3 with a suitably selected direct current and a superimposed low-frequency alternating current a voltage will be induced in the high-frequency winding 1 when a high-frequency sound wave is received, and that this voltage will inter alia contain the summation and difference frequencies of the sound wave that is received and the polarizing frequency. By phase separation of the voltages induced in the high-frequency windings 1 and 2 a suitable directional characteristic can be achieved in the same way as for the transmitting process.

Figure 2:
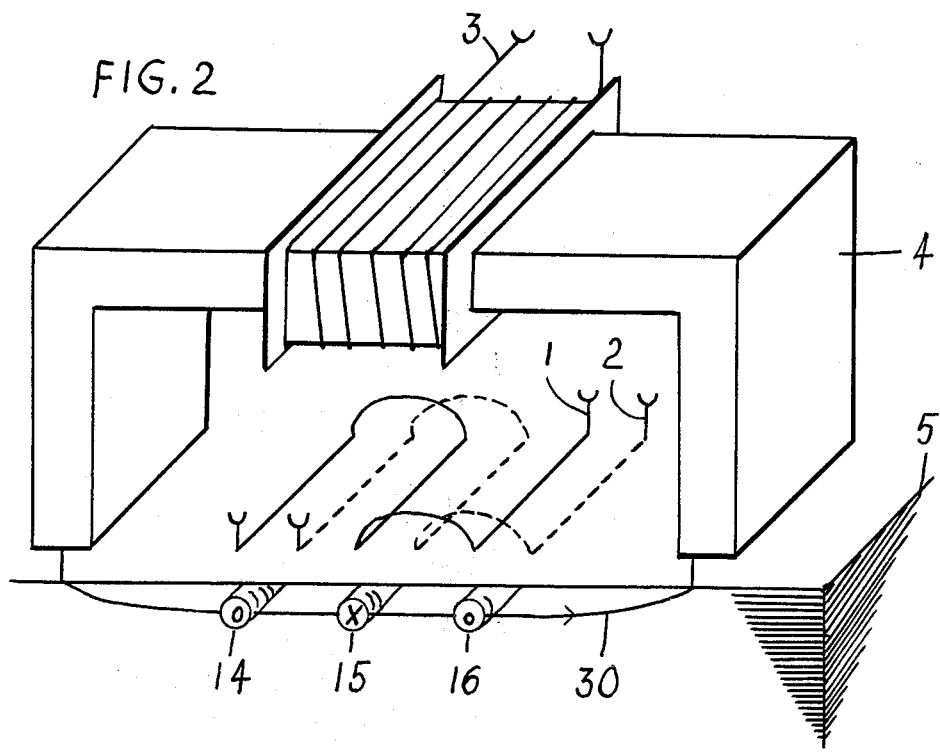
FIG. 2 is a similar view of an analogously used non-contact-making electrodynamic transducer according to the invention.

The embodiment of an electrodynamic non-contact-making transducer for materials' testing illustrated in FIG. 2 differs in principle from the magnetostrictive interacting transducer illustrated in FIG. 1 by its method of operation. A constant high-frequency current flowing through the high-frequency winding 1 near the electrically conducting surface 5 generates eddy currents of the same frequency in this surface by reason of the well known skin effect. These eddy currents closely correspond to the neighboring currents flowing through the high-frequency winding 1. The symbols 14, 15 and 16 diagrammatically indicate the direction in which these currents flow. One induction flux line of the low-frequency magnetic field generated by the polarizing coil 3 through the magnet yoke 4 is again marked 30. The sound vibrations are generated by the Lorentz forces acting on the currents in the magnetic field in the workpiece. Since these electrodynamically generated forces depend linearly upon the magnetic flux it is sufficient to energize the polarizing coil 3 with a low-frequency alternating current when the non-contact-making electrodynamic transducer is to be used according to the invention. The emitted sound waves generated by the transmission process will then consist principally of a continuous sound wave of the difference frequency and another wave of the summation frequency of the high-and low-frequency currents. Correspondingly the voltage induced in the high-frequency winding during reception will be the sum and difference of the frequency of the incoming sound wave and the frequency of the polarizing current. The directional characteristics of non-contact-making electrodynamic transducers for non-destructive materials' testing may be suitably designed for emission and reception in the same way as the magnetostrictive transducers by the appropriate selection of the geometrical arrangement, the frequency and the relative phase.

Figure 3:
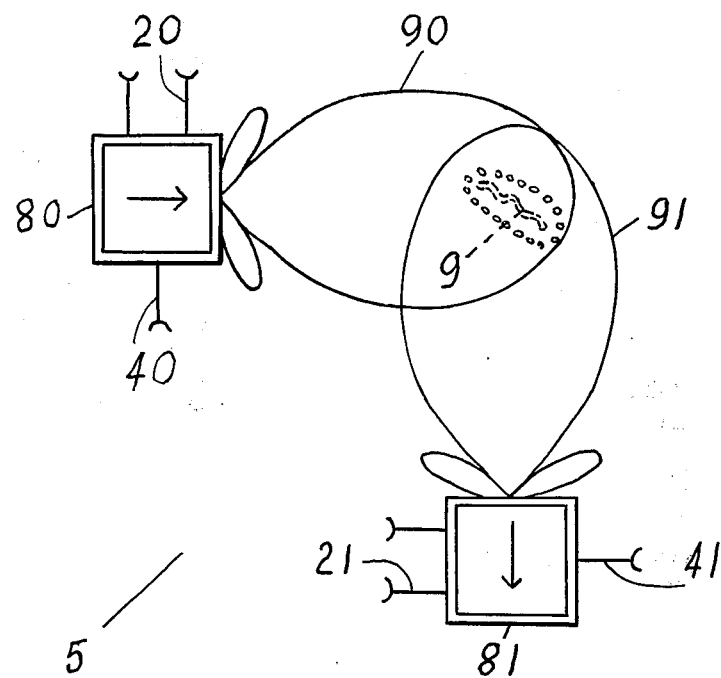
FIG. 3 is a schematic representation of a method of testing materials for the presence of internal defects.

The general layout of equipment for the non-destructive inspection of a material is schematically represented in FIG. 3. A first transducer 80 has a first directional characteristic 90 and continuously emits sound waves. These sound waves are received by a second non-contact-making transducer 81 having a second directional characteristic 91. When a defect 9 is located in the region where the two directional characteristics overlap, the transmitted sound waves are either dispersed or reflected by defect 9. Owing to the dependence on frequency of the direction of entry of the main lobe into the depth of the test object, workpieces can be inspected at different depths by varying the high frequency used at a given disposition of the transducers 80 and 81. For testing thin objects this facility is of course of no consequence. According to the proposed method, electrical high-frequency power is continuously applied to high-frequency windings 20 and by operating polarizing windings 40 and/or 41 with a low-frequency alternating current, the sound waves generate a high-frequency voltage which is amplitude-modulated by low frequency in the high-frequency windings 21 of the receiver 81.

The defect 9 is detected by an evaluation of the modulation amplitude, i.e. only parts of the spectrum of voltages induced in the high-frequency windings 21 differing from the transmitted frequency are evaluated.

There are several possible ways of evaluating the amplitude modulation. One is by rectification and filtration. Another way comprises synchronous demodulation by multiplying the received voltage with the suitably phase-shifted high-frequency and by then filtering in a low-frequency band pass tuned for instance to the summation frequency of the low-frequency currents in the polarizing windings 40 and 41. This latter method is particularly suitable because it suppresses transmitter noise as well as extraneous interference as caused by radio transmitters or other test frequencies.

The use of continuous sound waves which the performance of the invention requires has the result that in bodies in which only particular modes are capable of being transmitted the produced sound energy will be propagated in these modes. In such a case, the high-frequency windings of the transmitter are adapted to one mode for performing a test, whereas in one or more receivers the high-frequency windings are adapted to this mode or others. The defect is detected by the energy which is reflected at the defect or by the change to other modes. Moreover, the energy distribution between the received modes may be evaluated for an assessment of the position of the defect and its type.

Figure 4:
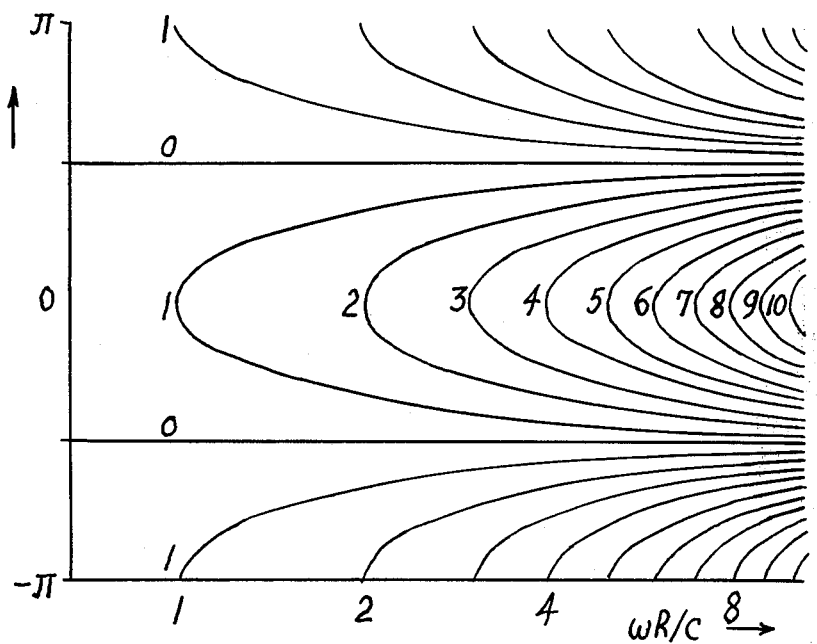
FIG. 4 is a graphic representation of possible helical modes and the functional relationship between transmission angle, frequency, sound velocity and the radius of rods and tubes.

The employment of the proposed method for an inspection of objects in which only particular modes are capable of being transmitted, for instance of rod and tube material, will be hereinafter illustratively described by reference to the testing of cylindrical rods for the presence of surface defects. For this purpose surface waves are employed which are propagated exclusively in the form of the modes illustrated in FIG. 4. These modes differ the one from the other by the number of cycles which in multiples of 360° indicate the phase angle through which the oscillation has passed when circling around the tested rod once in a closed path. This number of cycles is used as a parameter in FIG. 4. The wave fronts or rather the loci of equal phase are peripheral in a mode of 0 cycles; for all other modes they are helices. The direction on the surface normal to the wave fronts is the direction of propagation and encloses a transmission angle $\psi$ with the peripheral direction. This transmission angle $\psi$ is plotted with reference to the ordinate as shown in FIG. 4. The transmission velocity $c$ is the phase velocity in the direction of propagation. This transmission velocity $c$ is in the order of magnitude of the velocity of the well-known Rayleigh waves, but it depends upon the number of cycles and the transmission angle $\psi$. For a rod of known radius R and a transmission velocity $c$ (FIG. 4) permits the possible number of cycles and the associated transmission angles $\psi$ as functions of the angular frequency $\omega$ to be obtained. The generally four possible transmission angles $\psi$ for one mode relate to transmission in a left or right hand helix and in the forward or backward directions in relation to the rod axis.

Figure 5:
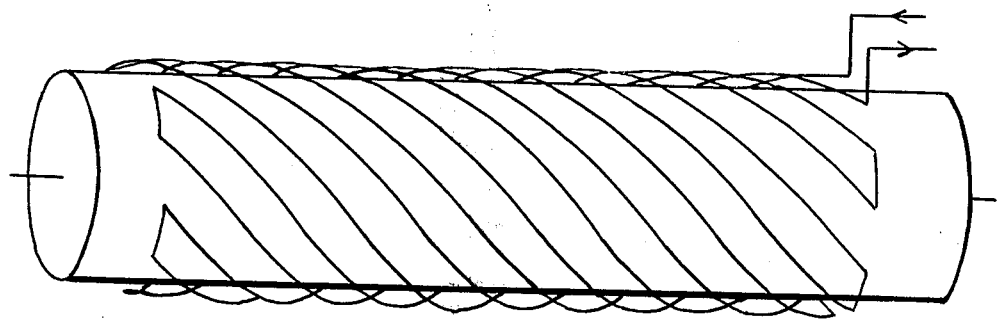
FIG. 5 is a schematic representation of a high-frequency winding for a non-contact-making transducer according to the invention for the generation of helical modes.

By adapting the geometry and operating the high-frequency windings at a suitably shifted phase, non-contact-making transducers for nondestructive testing according to the invention may be selectively coupled to a particular transmission angle of a particular mode. By way of example FIG. 5 is the high-frequency winding of such a non-contact-making transducer which has been selectively coupled to the mode having six cycles in a left hand screw. The polarization required for performing the proposed method is applied in the axial direction of the rod.

Figure 6:
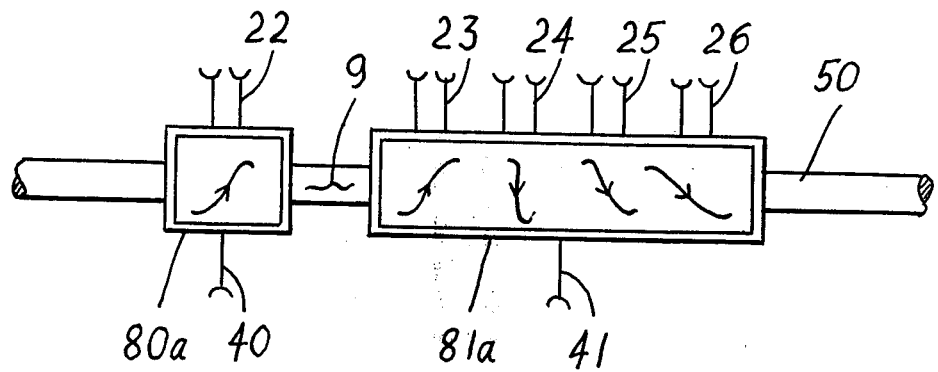
FIG. 6 is a schematic representation of a method of testing rods and tubes according to the invention with the aid of helical modes.

FIG. 6 is a schematic illustration of the proposed method of inspection applied to rod-shaped testing objects 50. The power continuously applied to high-frequency windings 22 of a first transducer 80a generates a mode having a specific number of cycles in a screw of particular hand which is transmitted towards a second transducer 81a constituting a receiver where it is received by high-frequency windings 23 which have been adapted to this mode and hand of rotation.

If this mode finds a defect 9 in its path, then the energy transferred at the defect to the possible modes travelling in the direction towards the receiver 81a can be detected by the windings adapted to the several modes and hands of rotation. For the detection of a defect 9 orientated for instance in the longitudinal direction of the rod, a high-frequency winding 25 is particularly suitable for the directional reception of the transmitted mode of opposite hand. However, other high-frequency windings 24 and 26 for neighboring modes of contrary hand enable a more precise location of the defect and its nature to be made. The directional generation and directional reception of the modes used for detection localizes the discontinuity in the gap between the first transducer 80a constituting the transmitter and the second transducer 81a constituting the receiver and possible interferences by mode reflections and conversions at the ends of the test object 50 are suppressed. By considering the ratio between the voltages in the windings 24, 25 and 26 and the voltages in the polarizing winding 23 the effect of varying coupling conditions upon the detection of defects can be excluded. The high-frequency windings 23 to 26 of the receiver may be pancake or stacked windings interleaved to eliminate mutual electrical interference, so that the same polarizing winding 41 can be used for any receiver windings. If both transmitter and receiver are operated with low-frequency polarization, then this may be generated by a common polarizing winding which will then make for a particularly compact and space-saving design of the non-contact-making testing equipment.

The invention may be embodied in other specific forms without departing from the spirit or essential characteristics thereof. The embodiments are therefore to be considered in all respects as illustrative and not restrictive.

What is claimed is:

1. A method of nondestructively testing materials by a transmitter and a receiver of ultrasound, wherein the transmitter and receiver each have characteristic directional lobes during operation thereof, said method comprising the steps of:
   a. continuously supplying a non-contact-making transmitter with electrical high frequency power at a suitable frequency for generating ultrasound waves;
   b. amplitude-modulating the generated ultrasound waves with a low frequency produced by the creation of a low-frequency magnetic field, and
   c. separating the received acoustical signals from internal noise or external interference by detection of the amplitude-modulation.

2. A method as defined in claim 1, wherein the characteristic directional lobes of the transmitter and the receiver are caused locally to overlap in a geometrical configuration whereby the reception of the sound waves refracted or reflected by the defect also positionally locates the defect.

3. A method as defined in claim 1, wherein the transmitter is unilaterally directionally coupled to a first particular mode;
a second particular mode is generated by conversion of said first generated mode, and
there is a receiver which is unidirectionally coupled to said second particular mode whereby the receiver detects a defect by the reception of the second mode.

4. A method as defined in claim 3, wherein the mode transmitted by the transmitter is transmitted in the form of right or left hand helices for testing rods or tubes.

5. A method of nondestructively testing materials by ultrasound comprising the steps of:
  a. providing non-contact-making means for transmitting and receiving ultrasound waves within the material to be tested,
  b. continuously supplying the transmitting means with electrical high-frequency power at a suitable frequency for generating ultrasound waves,
  c. producing a low-frequency in the non-contact-making means to amplitude-modulate the high-frequency oscillations present in the non-contact-making means during operation thereof, and
  d. evaluating the amplitude-modulated high-frequency oscillations to separate the received acoustical signals caused by internal noise or external interference.

6. A method as defined in claim 10, wherein the low-frequency is produced in the transmitting means.

7. A method as defined in claim 10, wherein the low-frequency is produced in the receiving means.

8. A method as defined in claim 10, wherein the low-frequency is produced by the creation of a low-frequency magnetic field.

9. A method of nondestructively testing materials by ultrasound comprising the steps of:
  a. providing a non-contact-making transmitter and a non-contact-making receiving receiver of ultrasound waves within the material to be tested,
  b. continuously supplying the transmitter with a suitable frequency for generating ultrasound waves,
  c. amplitude-modulating the signal voltage received in the receiver with a low-frequency produced by the creation of a low-frequency magnetic field, and
  d. evaluating the amplitude-modulated high-frequency oscillations to separate the received acoustical signals caused by internal noise or external interference.

* * * * *